Aug. 13, 1940.     C. R. WAGNER     2,211,248
METHOD OF PRODUCING MOTOR FUELS FROM HYDROCARBON GASES
Filed Jan. 25, 1939
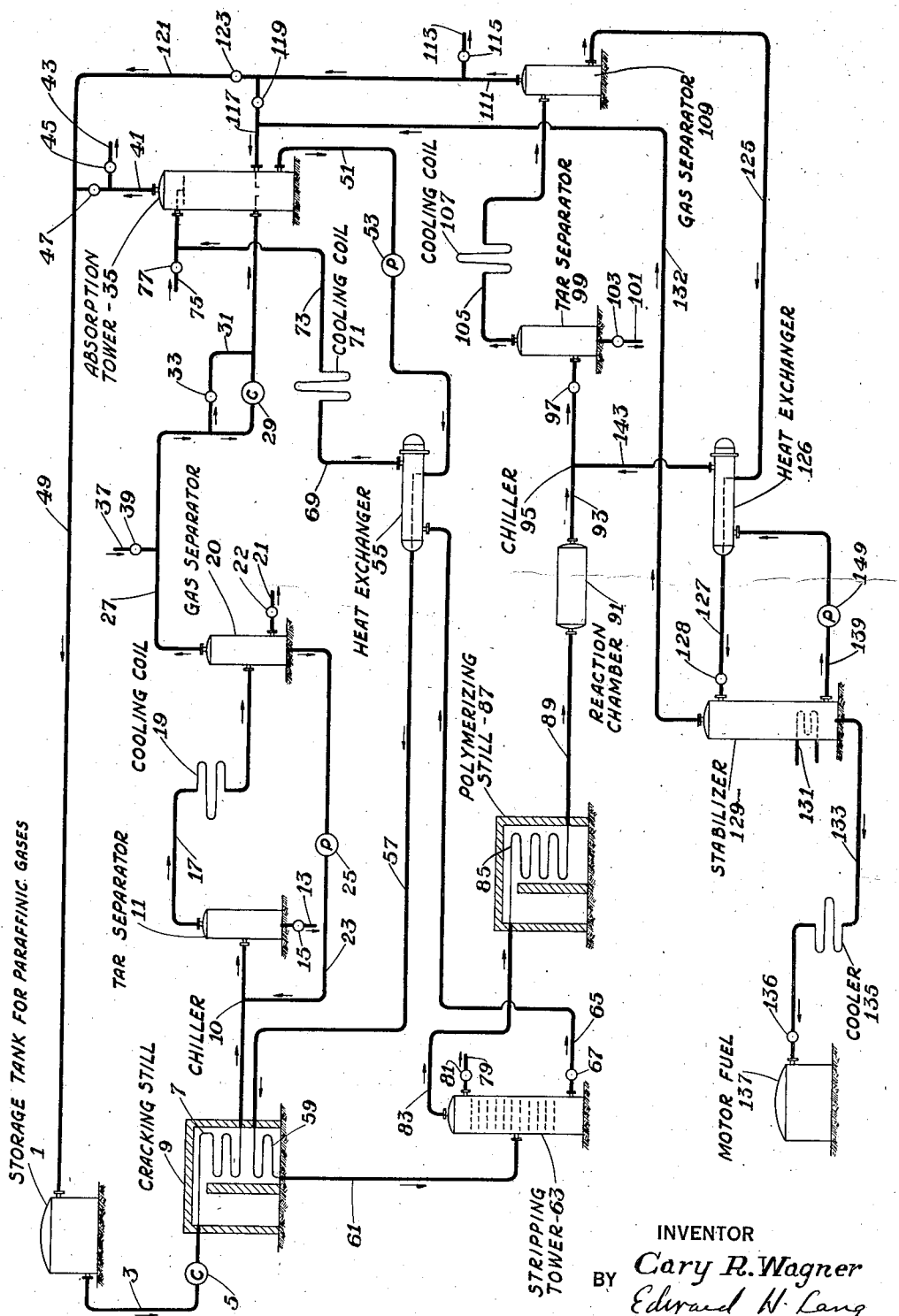
INVENTOR
BY *Cary R. Wagner*
*Edward H. Lang*
ATTORNEY Patented Aug. 13, 1940

2,211,248

UNITED STATES PATENT OFFICE

2,211,248

METHOD OF PRODUCING MOTOR FUELS FROM HYDROCARBON GASES

Cary R. Wagner, Chicago, Ill., assignor to The Pure Oil Company, Chicago, Ill., a corporation of Ohio Application January 25, 1939, Serial No. 252,719

10 Claims. (Cl. 196—10)

This application is a continuation-in-part of application Serial No. 684,228, filed August 8, 1933, which in turn is a continuation-in-part of application Serial No. 595,748, filed February 29, 1932 (Patent No. 2,088,887).

This invention relates to the utilization of hydrocarbon gases for the purpose of producing an improved motor fuel falling within the boiling range of gasoline. The invention is applicable to the treatment of paraffinic, olefinic or mixed paraffinic and olefinic hydrocarbon gases.

The method of concentrating olefins in hydrocarbon gas by solution in a hydrocarbon solvent prior to polymerization of the gas is disclosed and claimed in applicant's Patent No. 2,088,887. Heretofore it has been common practice to compress the gas to pressures sufficient to effect separation of olefins in the absorption stage and then separate the dissolved gas from the absorption menstruum at reduced pressure. Such practice necessitates recompression of the separated gas prior to polymerization with the attendant high costs of compression.

It is also known to compress gas to a sufficiently high pressure prior to the absorption stage so that the dissolved gas can be subsequently separated and liquefied without imposing additional pressure thereon. In this process, however, the initial cost of compression is high since not only is it necessary to compress that portion of the gas which is to be polymerized, but also the unreactive portion of the gas which usually amounts to at least as much as or more than the desirable or polymerizable portion. This invention is designed to eliminate the disadvantages inherent in prior methods involving concentration of olefins and preparation thereof for treatment under high pressure.

It is an object of this invention to convert hydrocarbon gases into liquid hydrocarbons.

Another object of the invention is to concentrate olefins and place them under high pressure without the necessity for imposing high pressures on materials in the gaseous state.

Another object of the invention is to provide a method for polymerizing hydrocarbon gases under high pressures without the necessity of compressing the gases to high pressures.

A further object of the invention is to provide an economical method of concentrating the olefins in the charging gas prior to charging it to the polymerization zone.

Other objects of the invention will become apparent from the following description considered in connection with the accompanying drawing of which the single figure is a diagrammatic elevational view of apparatus suitable for carrying out the invention.

Referring to the drawing, the numeral 1 represents a storage or feed tank for hydrocarbon gases which are predominantly paraffinic in nature. These gases may comprise natural gas, refinery gas, still gases or other hydrocarbon gases from any other source. These gases are composed chiefly of saturated hydrocarbons of the aliphatic series and particularly those boiling between —140° F. and 64.8° F. such as ethane, propane, butane and pentane.

The gases are withdrawn from the storage tank 1 through line 3 by means of compressor 5 and charged into heating and cracking coil 7 located in the furnace 9. Cracking may take place at substantially atmospheric pressure or at super-atmospheric pressure of the order of 30 to 75 lbs. per square inch and at temperatures of from approximately 932° F. to 1652° F. Higher or lower temperatures may be employed, but the range indicated produces the most satisfactory results. In the cracking coil 7 cracking of the gases takes place with the formation of higher boiling hydrocarbons, unsaturated or olefinic gases and hydrogen.

The products leaving the cracking coil 7 are chilled at 10 by direct contact with cool hydrocarbon liquid to a temperature below cracking, but above the temperature at which the gasoline boiling hydrocarbons condense. This temperature may range from approximately 400° F. to 550° F. From the chiller the products pass into the separator 11 where the tar and heavy boiling hydrocarbons condense and are withdrawn from the system through the line 13 controlled by valve 15. The uncondensed gases and vapors leave the top of the separator 11 through line 17 and pass through cooling coil 19 where the products are cooled to a temperature sufficiently low to condense the gasoline boiling hydrocarbons. This temperature may range from approximately 60° to 100° F.

From the cooling coil the products pass into the gas separator 20 from which the gasoline boiling liquid may be withdrawn through line 21 controlled by valve 22. This liquid consists largely of aromatic hydrocarbons such as benzol, toluol and xylol. A portion of the condensate in the separator 20 may be withdrawn through line 23 by means of pump 25 and returned to the chiller 10 to cool the reaction products leaving the cracking coil 7.

Uncondensed gases and vapors leave the top of the separator 20 through line 27. These gases may consist of ethylene, ethane, propylene, propane, butylene, butane and some hydrogen and methane. These gases are charged by means of the compressor 29, or through bypass line 31 controlled by valve 33, into the absorption tower 35. If the pressure on the gases is sufficient, the compressor may be dispensed with and the bypass line used. However, where cracking takes place under atmospheric or under very low superatmospheric pressure, it may be necessary to compress the gases somewhat in order that the absorption process may work efficiently.

If desired, olefinic gases such as those produced in the vapor phase cracking of hydrocarbon oils from an outside source may be introduced into line 27 through line 37 controlled by valve 39. Since gases from vapor phase cracking are rich in olefinic content, it is not necessary to crack these gases in order to make them useful as charging stock for the polymerization system.

The gases may be charged into the bottom of the absorption tower 35 at a pressure of approximately 15 to 350 pounds per square inch, depending upon the solvent used and the concentration of olefins in the supply gas. The pressure maintained in the tower is only sufficient to make the absorption system work efficiently. In the tower the gases pass counter-current to a descending oil or menstruum such as gas oil, solvent naphtha, cresol, high boiling ketones or esters, or other products capable of selectively dissolving olefins from such a mixture of olefins and paraffins as are contained in the gases. Unabsorbed gases leave the top of the absorption tower through line 41 and may be withdrawn from the system through line 43 controlled by valve 45. If desired, a part or all of the unabsorbed gases may be returned through valve 47 and line 49 to storage tank 1.

The unabsorbed gases leaving the top of the absorption tower have been to a large extent denuded of olefinic constituents and consist chiefly of hydrogen, methane and ethane, with lesser amounts of ethylene and smaller quantities of propane, propylene, butane and butylene. The rich absorption menstruum is withdrawn from the bottom of the absorption tower 35 through line 51 by means of pump 53. The absorption menstruum thus withdrawn has in solution a mixture of hydrocarbons in which the percentage of olefins is very much higher than in the original gas in the storage tank 1. Depending upon the analysis of the original gas, the solvent employed and the pressures employed, the mixture of gases contained in the absorption menstruum may range from 45 to 75% olefins. The pressure on the rich absorption menstruum is raised by the pump 53 to a pressure from between 600 to 1500 pounds per square inch and is pumped under this pressure through heat exchanger 55, line 57, heating coil 59 located in the cooler portion of furnace 9, and line 61, into the stripping tower 63. In the heat exchanger 55 the temperature of the rich absorption menstruum is raised somewhat and in the heating coil 59 the temperature is increased to the order of 300° F. to 600° F. by means of the waste gases from the heating of the gases in cracking coil 7. Within this temperature range the gases are liberated from the absorption menstruum under the existing pressure without substantially vaporizing the absorption menstruum.

It is of course within the range of the invention to distill the oil withdrawn from the bottom of the tower 35 in any other form of heater. However, the arrangement disclosed provides an economical method of heat transfer in a combined cracking and polymerizing system.

The stripping tower 63 is provided with a series of fractionating or bubble plates of the usual type in order to obtain efficient separation of the absorption liquid and the absorbed gases and vapors. The denuded absorption menstruum is withdrawn from the bottom of the stripping tower 63 through line 65 controlled by valve 67, heat exchanger 55, line 69, cooling coil 71 and line 73, back to the upper portion of the absorption tower 35. The pressure on the absorption menstruum is reduced at the valve 67 to a pressure substantially equal to that existing in the absorption tower 35. In the heat exchanger 55 the hot denuded absorption menstruum passes in indirect heat exchange with the rich relatively cool absorption menstruum, leaving the absorption tower 35 and gives up its heat thereto. The partially cooled denuded absorption menstruum is further cooled down to the desired temperature for absorption, namely, approximately 75-100° F. in the cooling coil 71. Absorption menstruum is initially charged into the absorption tower through line 75 controlled by valve 77, and any additional absorption menstruum required from time to time is charged through the same line.

Any gasoline boiling hydrocarbons which may have come off the separator 20 with the gases are absorbed in the absorption menstruum in the tower 35 and subsequently separated therefrom in the stripping tower 63. The gasoline may be withdrawn from the upper portion of the tower 35 as a side stream through line 79 controlled by valve 81. The uncondensed gases rich in olefins and consisting chiefly of butylene, propylene, butane, propane and ethylene are charged through line 83, without any substantial reduction in the pressure imposed by the pump 53, into the heating coil 85 located in furnace 87. The pressure on the gases charged to the heating coil 85 may range from approximately 600 to 1500 pounds per square inch. It is of course within the scope of the invention to charge the gases to the heating coil 85 at higher or lower pressure and in the event higher pressures are used, a compressor will necessarily be inserted in the line 85. If lower pressures are used, a pressure reducing valve will necessarily be inserted in the line.

In the heating coil 85 the gases are heated to a temperature ranging between 800° F. to 1300° F. in order to initiate polymerization of the gases. From the coil 85 the heated gases pass through transfer line 89 into reaction chamber 91. This reaction chamber is preferably of enlarged cross-sectional area and preferably unheated. Since the polymerization reaction is exothermic, the reaction will maintain itself in the enlarged reaction chamber 91. The reaction chamber is of enlarged diameter in order to provide the time element for the polymerization reaction. The reaction drum is not necessarily placed exteriorly of the furnace. Any equivalent structure wherein the exothermic heat of the polymerization reaction is kept under control is within the scope of the invention. Unless overheating of the gases undergoing polymerization is avoided, cracking and excessive coke formation takes place.

The products leave the reaction zone 91 through line 93 and are cooled below reaction temperature by a direct type of cooler or chiller at 95. The products are chilled only to a temperature sufficient to arrest the reaction and condense those constituents boiling above the gasoline range, but to a temperature above the point at which the gasoline boiling constituents condense. This temperature may range from 500° F. to 700° F. From the chiller 95 the partially cooled products pass into tar separator 99 wherein the condensed high boiling fractions separate and are withdrawn from the system through line 101 controlled by valve 103. The uncondensed gasoline boiling constituents and gaseous hydrocarbons are withdrawn from the top of the separator 99 through line 105 and cooled in cooling coil 107 to a temperature of approximately 70 to 90° F. in order to condense the gasoline boiling hydrocarbons. From the cooler 107 the products are passed into gas separator 109 wherein the hydrocarbons boiling within the gasoline range, together with heavier fractions of the gases, separate as a condensate. The uncondensed gases leave the top of the separator through line 111 and may be eliminated from the system through line 113 controlled by valve 115; or may be recycled back to the absorption tower 35 through line 117 controlled by valve 119; or may be returned through line 121 controlled by valve 123 and line 49 to the storage tank 1. It will be apparent that by proper manipulation of the valves 115, 119 and 123, the gases leaving the separator 109 may be split and any desired portion, withdrawn from the system, returned to the absorber, or returned to the storage tank 1.

The tar separator 99 and gas separator 109 are preferably operated at a pressure approximating 600 pounds per square inch, and where higher pressures are used in the heating and reaction zones, the pressure may be reduced by means of the valve 97.

The gases withdrawn from the top of the separator 109 through line 111 will consist chiefly of ethane and propane, with minor quantities of unreacted butane, butylene, propylene and ethylene and smaller quantities of methane and hydrogen.

Condensate is withdrawn from the gas separator 109 through line 125 through heat exchanger 126, line 127 controlled by valve 128 and charged into the upper portion of stabilizer 129. The pressure on the condensate is reduced at valve 128 to approximately 200 to 400 pounds per square inch, which pressure is maintained in the stabilizer 129. The pressure in the stabilizer is maintained above the pressure in the absorption tower. In the stabilizer 129 the more volatile constituents, particularly propylene, butylene, propane and butane, are removed in order to make a final product of the desired vapor pressure. The heat necessary to remove the light constituents from the unstabilized condensate may be furnished by means of a heating coil 131. These volatile constituents leave the top of the stabilizer through line 132 and are conducted back to the absorption tower 35 through line 117. The pressures on these gases are sufficient so that compression is unnecessary in order to charge them back to the absorption tower. The stabilized motor fuel condensate is withdrawn from the bottom of the tower through line 133, cooler 135, pressure reducing valve 136, into tank 137 where the final motor fuel distillate is cooled. A portion of the condensate from the bottom of the stabilizer may be withdrawn through line 139 by means of pump 149 through heat exchanger 126 and line 143 to the chiller 95 in order to cool the reaction products in the polymerization chamber below reaction temperature. In the heat exchanger 126 the hotter condensate from the bottom of the stabilizer gives up its heat to the cooler condensate coming from the gas separator 109.

If desired, the gasoline boiling constituents withdrawn from separator 20 and stripper 63 may be charged into stabilizer 129 together with the condensate from separator 109.

In view of the foregoing, it will be seen that the present invention provides a practical and economical method for treating hydrocarbon gases of low economic value whereby to convert the latter in part into normally liquid oils which have a much higher value. The present invention renders the use of saturated hydrocarbon gases feasible as a charging stock for such a polymerizing system and by the absorption method and/or its equivalent, the use of high compression pressures are avoided since separation of the olefinic constituents can be effected at relatively low pressures and the necessary polymerization pressure can be subsequently imposed on the rich absorption menstruum. By then separating the dissolved gases from the menstruum without release of pressure, the expense of compressing gases to high pressures is entirely avoided. Usually, the gases which are delivered to the polymerizing system predominate in their butylene and propylene content and are thus entirely suitable for the conditions of the polymerizing reactions. The reaction zone of the polymerizing stage is preferably non-catalytic in character. This can be attained by lining the drum 91 with firebrick, silica or by carrying on the reactions in a checker brick chamber in which polymerizing is effected at higher temperatures than those normally employed in such operations together with shorter reaction periods, and lower pressures. It is within the range of the invention to employ a polymerizing zone wherein the walls of said zone are completely non-catalytic with respect to the hydrocarbons undergoing heat treatment therein. Heretofore such reaction zones have been formed with walls of ferrous material such as steel or alloy steel tubes or chambers. Iron, however, catalyzes dehydrogenation and, therefore, in polymerization processes utilizing iron walled reaction chambers, there is a tendency toward increased coke formation. This necessitates the employment of relatively low temperatures such as those of the order of 900° to 1050° F. with high pressures. By the use of the non-catalytic reaction zone, higher temperatures may be advantageously employed, such as 1100° F. to 1400° F. with low pressure to obtain greater yields of liquid hydrocarbons with no substantial increase in coke formation.

What I claim is:

1. A process for the conversion of olefin-containing hydrocarbon gases into liquid hydrocarbons which comprises contacting said gases under relatively low superatmospheric pressure with a solvent capable of dissolving olefinic hydrocarbons, separating the unabsorbed gases from the solvent containing the dissolved gases, raising the pressure on the enriched solvent to relatively high superatmospheric pressure, heating the solvent and dissolved gases while under high pressure to a temperature sufficient to distill the gases from the solvent, separating the solvent from the gases under the last mentioned pressure, and without release of pressure charging the gases last separated from the solvent through a polymerization zone wherein the gases are subjected to temperatures sufficient to convert a substantial portion of the gases to hydrocarbons boiling within the gasoline range, cooling the resulting products, and separating the resulting products into liquids and gases.

2. Process in accordance with claim 1 in which the gases unabsorbed by the solvent are discharged from the system.

3. Process in accordance with claim 1 in which the gases are contacted with solvent at a pressure ranging from 15 to 350 pounds per square inch and the pressure on the enriched solvent is raised to 600 to 1500 pounds per square inch.

4. Process in accordance with claim 1 in which the resulting products are separated at pressures above that employed in the solvent contacting step, into normally liquid and normally gaseous fractions and normally gaseous fractions are recycled to the solvent contacting step.

5. Process in accordance with claim 1 in which the gases are contacted with solvent at a pressure ranging from 15 to 350 pounds per square inch, the pressure on the enriched solvent is raised to 600 to 1500 pounds per square inch, the gases are separated from the solvent at a temperature between 300 and 600° F. and passed, without cooling, to the heating and polymerization zone in which the gases are polymerized at temperatures between 800–1300° F.

6. A process for the conversion of hydrocarbon gases to liquids which comprises passing predominantly paraffinic gases through a cracking zone wherein the gases are subjected to temperatures and relatively low pressures suitable for converting a substantial portion of the paraffinic to olefinic hydrocarbons, cooling the reaction products to a temperature sufficient to condense normally liquid hydrocarbons, separating the normally liquid from the normally gaseous hydrocarbons, contacting the normally gaseous hydrocarbons under relatively low superatmospheric pressure with a solvent capable of dissolving olefinic hydrocarbons, separating the unabsorbed gases from the solvent containing the dissolved gases, raising the pressure on said solvent and dissolved gases to a relatively high superatmospheric pressure and heating the same while under such pressure to a temperature sufficient to distill the dissolved gases from the solvent, separating the solvent from the gases under the last mentioned pressure, and without release of pressure charging the gases last separated from the solvent through a polymerization zone wherein the gases are subjected to temperatures sufficient to convert a substantial portion of the gases to hydrocarbons boiling within the gasoline range, cooling the resulting products, and separating the resulting products into liquids and gases.

7. Method in accordance with claim 6 in which the resulting products are separated into liquids and gases in a plurality of stages, in one of which stages lighter gases are separated from liquids and in another of which stages heavier gases are separated from liquids, both stages being conducted at pressures above those employed in the solvent contacting step, and the heavier gases are recycled to the solvent contacting step.

8. Process in accordance with claim 6 in which the gases are contacted with solvent at a pressure ranging from 15 to 350 pounds per square inch and the pressure on the enriched solvent is raised to 600 to 1500 pounds per square inch.

9. Process in accordance with claim 6 in which the gases are contacted with solvent at a pressure ranging from 15 to 350 pounds per square inch, the pressure on the enriched solvent is raised to 600 to 1500 pounds per square inch, the gases are separated from the solvent at a temperature between 300 and 600° F. and passed, without cooling, to the heating and polymerization zone in which the gases are polymerized at temperatures between 800–1300° F.

10. A process for the conversion of olefin-containing hydrocarbon gases into liquid hydrocarbons which comprises contacting said gases under relatively low super-atmospheric pressure with a solvent capable of dissolving olefinic hydrocarbons, separating the unabsorbed gases from the solvent containing the dissolved gases, raising the pressure on the enriched solvent to relatively high super-atmospheric pressure, supplying sufficient heat to the enriched solvent while under said high pressure to distill the gases from the solvent, separating the gases from the solvent under the last mentioned pressure, and without substantially releasing the pressure, charging gases last separated from the solvent to a polymerization zone wherein the gases are subjected to temperatures sufficient to convert a substantial portion of the gases to hydrocarbons boiling within the gasoline range, cooling the resulting products, and separating the resulting products into liquids and gases.

CARY R. WAGNER.